(12) United States Patent
Ghoneim

(10) Patent No.: US 8,296,014 B2
(45) Date of Patent: Oct. 23, 2012

(54) MOTOR VEHICLE DRIVER ASSISTING METHOD NEAR THE STABILITY LIMIT

(75) Inventor: Youssef Ghoneim, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 590 days.

(21) Appl. No.: 12/486,644

(22) Filed: Jun. 17, 2009

(65) Prior Publication Data
US 2009/0319127 A1  Dec. 24, 2009

(30) Foreign Application Priority Data

Jun. 18, 2008 (EP) .................................. 08011022

(51) Int. Cl.
*B62D 15/02* (2006.01)
*B60W 10/18* (2006.01)
*G06F 19/00* (2006.01)

(52) U.S. Cl. .............................. 701/41; 701/42; 340/440
(58) Field of Classification Search .................... 701/41, 701/29, 42; 340/441, 438, 440
See application file for complete search history.

(56) References Cited

U.S. PATENT DOCUMENTS

| 2006/0208564 A1* | 9/2006 | Yuda et al. ................... 303/146 |
| 2007/0239333 A1* | 10/2007 | Galkowski et al. ............ 701/41 |
| 2007/0276564 A1* | 11/2007 | Shin et al. ..................... 701/41 |
| 2008/0015754 A1* | 1/2008 | Hac ............................... 701/48 |
| 2009/0093928 A1* | 4/2009 | Getman et al. ................ 701/37 |
| 2010/0114449 A1* | 5/2010 | Shiozawa et al. ............. 701/90 |

FOREIGN PATENT DOCUMENTS

| DE | 4200997 A1 | 7/1993 |
| DE | 102005000726 A1 | 8/2005 |
| DE | 102004030997 A1 | 1/2006 |
| DE | 102004033474 A1 | 1/2006 |
| DE | 102006026937 A1 | 1/2007 |
| EP | 0492782 A2 | 7/1992 |
| EP | 0808732 A1 | 11/1997 |
| EP | 1195304 A2 | 4/2002 |
| EP | 1380484 A1 | 1/2004 |
| EP | 1407949 A1 | 4/2004 |
| FR | 2748239 A1 | 11/1997 |

OTHER PUBLICATIONS

European Patent Office, European Search Report for Application No. 08011022.4, dated Dec. 18, 2008.

* cited by examiner

*Primary Examiner* — Tan Q Nguyen
(74) *Attorney, Agent, or Firm* — Ingrassia Fisher & Lorenz, P.C.

(57) ABSTRACT

A method for assisting a driver of a motor vehicle is provided that includes, but is not limited to monitoring at least one quantity selected among vehicle sideslip, yaw rate error, understeer and quantities correlated to vehicle sideslip, yaw rate error or understeer, deciding that there is a risk of the vehicle becoming unstable if any of the monitored quantities or a quantity derived from one or more of the monitored quantities exceeds a predetermined first threshold, and if it is decided that there is a risk, issuing a warning signal.

15 Claims, 2 Drawing Sheets

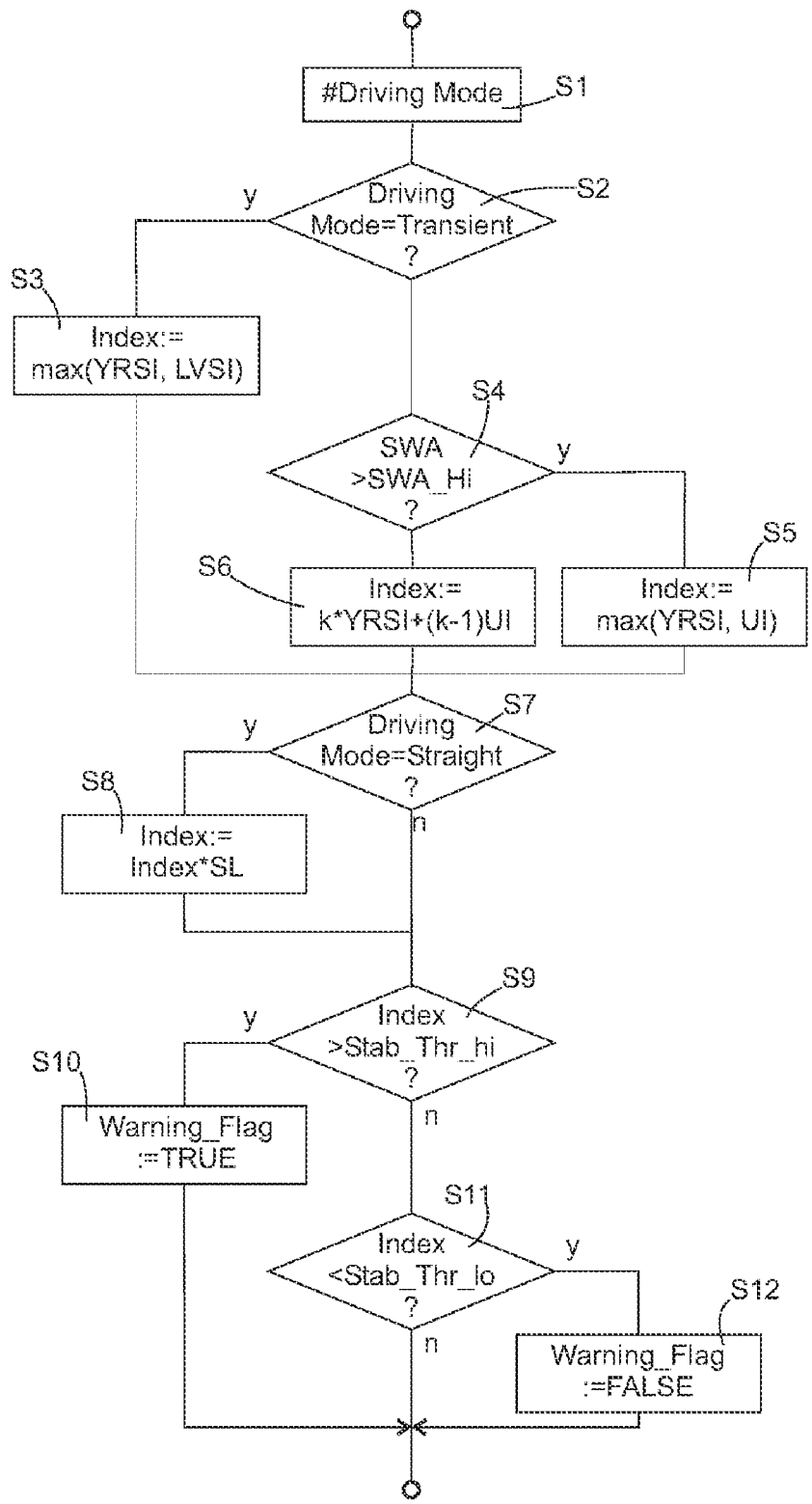

MOTOR VEHICLE DRIVER ASSISTING METHOD NEAR THE STABILITY LIMIT

CROSS-REFERENCE TO RELATED APPLICATION

This application claims priority to European Patent Application No. 08011022.4, filed Jun. 18, 2008, which is incorporated herein by reference in its entirety.

TECHNICAL FIELD

The present invention relates to a method for assisting a driver of a motor vehicle in order to improve driving safety under potentially adverse road conditions.

BACKGROUND

In recent years, electronic stability control systems for motor vehicles have become increasingly popular. Conventionally, such systems monitor vehicle stability-related quantities such as a yaw rate error, i.e., a deviation between yaw rates expected based on vehicle speed and steering wheel angle and an observed yaw rate, and respectively brake the wheels at one side of the vehicle in order to assist cornering, i.e., to decrease the deviation between expected and observed yaw rates.

An inherent dilemma in conventional ESC systems is the fact that drivers expect them to become active reliably in critical situations and then to have a noticeable effect on the motion of the vehicle, whereas, on the other hand, the driver is easily annoyed if the ESC system interferes in a situation which he is or at least believes to be capable of handling himself. In order to make ESC system as unintrusive as possible, its activation threshold will have to be set rather high, thus allowing the driver to get into a problematic situation where harsh measures of the ESC system are necessary and which might easily have been prevented with a lower activation threshold.

At least one object of the present invention is to help solve this dilemma. In addition, other objects, desirable features, and characteristics will become apparent from the subsequent detailed description, and the appended claims, taken in conjunction with the accompanying drawings and this background.

SUMMARY

An embodiment of the invention provides a method for assisting a driver of a motor vehicle comprising the steps of monitoring at least one quantity selected among the vehicle sideslip, yaw rate error, understeer and quantities correlated to the first-mentioned quantities, deciding that there is a risk of the vehicle becoming unstable if any of said monitored quantities or a quantity derived from one or more of said monitored quantities exceeds a predetermined first threshold, and if it is decided that there is a risk, issuing a warning signal By heeding the warning signal and preferably reducing speed, the driver can avoid many situations which would cause an ESC system to intervene. The method might therefore be used in place of a conventional ESC system; preferably it is implemented in combination with an ESC system, so as to enhance its effects.

The first threshold should be a function of vehicle speed and steering wheel angle.

The warning signal may be output to the driver as an audible, visible or haptic signal. A visible signal may, for example, be displayed to the driver in a head-up display, so that it will be noticed by a driver who is keeping his eyes fixed on the road in front of him. A haptic signal, on the other hand, may be used to drive an actor associated to a control pedal of the vehicle or to the steering wheel, so that it will be felt reliably in practically any driving situation.

A warning signal might also be output as a braking control signal to all brakes of the vehicle.

As indicated above, it can be useful to combine the method of the invention with the operation of a conventional ESC system, i.e., a method may further comprise the step of selectively braking wheels of the vehicle in case of any of said monitored quantities exceeding a second threshold. The second threshold should then be predetermined so as to be exceeded substantially only if the first threshold is also exceeded, i.e., in most cases selective braking will be applied only if the driver has received a warning before and has not or not sufficiently reacted to the warning.

The first and second thresholds can be defined for different quantities. However, if they are defined for a same quantity, it can be ensured that a warning signal is issued prior to any selective braking.

Preferably, the first and second thresholds are set so that in most driving situations the driver will have sufficient time to react to the warning before selective braking is applied. However, this can only be a general rule for setting the first and second thresholds since it cannot be predicted how the monitored quantity will change with time in any particular case.

A step of cancelling the warning signal is preferably carried out only if a quantity which exceeded the first threshold drops below a third threshold which is lower than the first, in order to prevent the warning signal from being switched off and on repeatedly in a short time.

In order to ensure that a warning is issued in any situation where it is appropriate, it is helpful to normalize the monitored quantities in relation to a reference value and to derive a quantity for comparison to the above-mentioned first threshold from at least two of these normalized quantities.

The quantity for comparison may preferably be a maximum or a weighted sum of the normalized quantities. The choice of one or the other may be dependent on a driving mode of the vehicle.

Specifically, the maximum may be selected as the quantity for comparison if a steering wheel angle is above a predetermined threshold, whereas a weighted sum is selected if the steering wheel angle is below the threshold. In this way, in case of a high steering wheel angle, a warning will be generated if at least one of the monitored quantities is critically high, whereas at a lower steering wheel angle a warning is generated only if the normalized quantities add up to a critically high value.

If a vehicle is driven in a straight line, there are practically no lateral forces which might cause the driver to lose control of the vehicle. In order to prevent unnecessary warnings from being issued in such a case, it is appropriate to judge whether the vehicle is driving in a straight line or not, and, if it is judged to be driving in a straight line, to set at least the first threshold higher than if it is judged not to be driving in a straight line.

There are transient driving situations, in which a driver has to turn the steering wheel of the vehicle quickly and/or in alternating directions, so that a reliable estimation of the vehicle understeer is difficult. In order to take account of such situations it is appropriate to base the decision of above mentioned step b) on understeer only if the amount and/or the frequency of change of sign of the time derivative of the steering wheel angle is below a predetermined threshold.

BRIEF DESCRIPTION OF THE DRAWINGS

The present invention will hereinafter be described in conjunction with the following drawing figures, wherein like numerals denote like elements.

FIG. 3 is a flow chart of a process carried out in the arbitration block of the device of FIG. 1.

DETAILED DESCRIPTION

The following detailed description is merely exemplary in nature and is not intended to limit application and uses. Furthermore, there is no intention to be bound by any theory presented in the preceding background or summary the following detailed description.

For a proper understanding of the following description, it should be kept in mind that the invention will most likely be implemented in the form of an appropriately programmed microcontroller system, but that functionalities implemented as software in such a microcontroller system might as well be implemented by wired circuitry. Therefore, a description of individual features of the invention by means of circuit blocks or by means of method steps is dictated not by technical necessity but simply by the fact that in case of processes which are carried out simultaneously or the temporal relationship of which is of no concern for the invention, a description by means of a block diagram is held to be easier to understand than a flowchart, whereas the description of method steps by means of a flowchart is clearer if the steps can be straightforwardly grouped in a temporal order.

Figure 1:
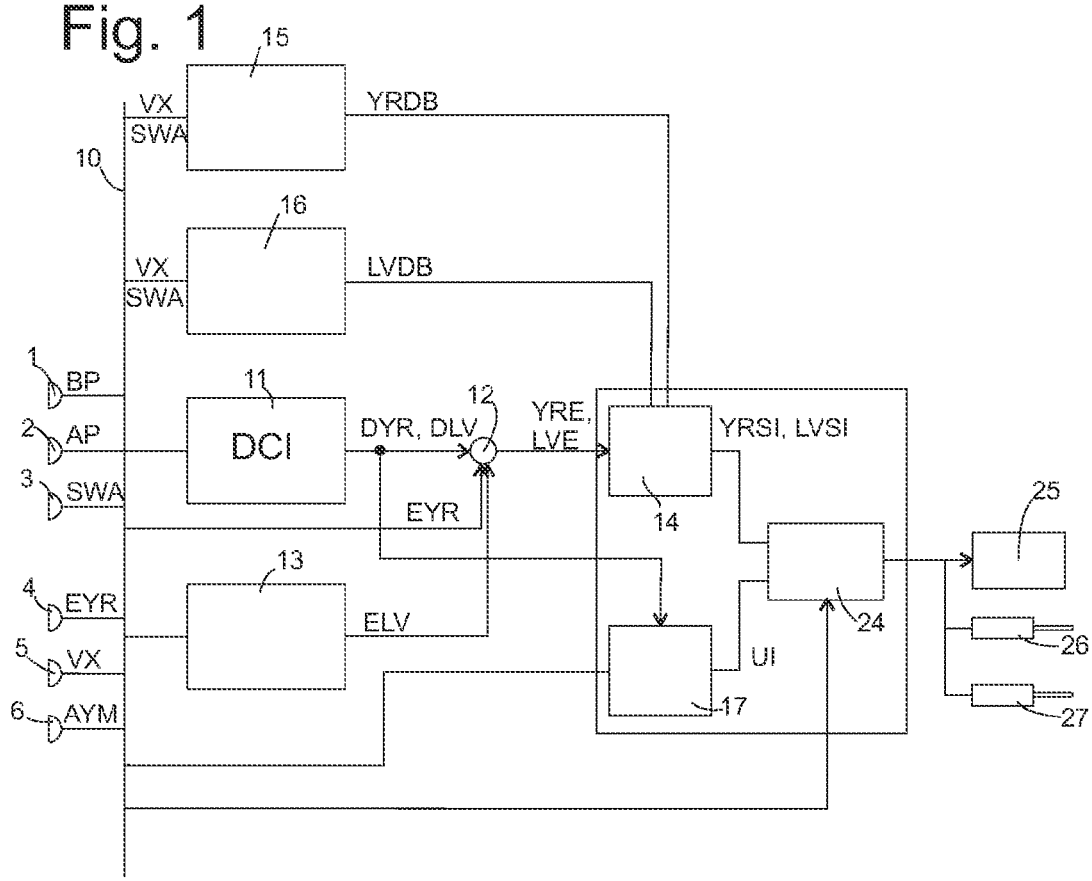
FIG. 1 is a block diagram of a device for implementing the method of the invention.

FIG. 1 is a block diagram of an apparatus for implementing the present invention. The apparatus comprises a plurality of sensors, all of which are conventionally provided in a motor vehicle, such as a brake sensor 1 providing a brake pedal signal BP indicating whether a brake pedal is depressed or not, and, eventually, a quantitative measure of the extent to which it is depressed; an accelerator pedal sensor 2 providing a signal AP representative of the accelerator pedal position, a steering wheel angle sensor 3 outputting a steering wheel angle signal SWA representative of the degree to which a steering wheel of the vehicle is rotated with respect to a reference orientation; a yaw rate sensor 4 which outputs an effective yaw rate signal EYR, a speed sensor 5 providing a vehicle longitudinal speed signal VX, and others. All these sensors are connected to a common data bus 10.

All components shown on the right hand side of data bus 10 in FIG. 1 may be components of a same microprocessor system or may be implemented by individual hardware components, as appropriate. One of these components, referred to as the driver command interpreter DCI 11 receives from data bus 10 signals SWA, VX and determines from these a desired yaw rate DYR and a desired lateral velocity DLV. The DCI 11 may comprise arithmetic circuitry for calculating the desired yaw rate DYR and the desired lateral velocity DLV based on a kinematic model of the motor vehicle and the measured values of the longitudinal velocity VX and the steering wheel angle SWA, or it may comprise lookup tables storing experimentally determined yaw rates and lateral velocities for a variety of combinations of vehicle speed and steering wheel angle.

A subtracting stage 12 outputs a yaw rate error YRE which is the difference between the desired yaw rate DYR from DCI 11 and the effective yaw rate EYR from yaw rate sensor 4. The subtracting stage 12 further computes a lateral velocity derivative error LVE which is the difference between the desired lateral velocity derivative DLV from DCI 11 and an effective lateral velocity derivative ELV computed in block 13 as follows:

$$ELV = AYM - EYR*VX \quad (1)$$

Where AYM is a lateral acceleration directly measured by acceleration sensor 6. In short, the effective lateral velocity derivative ELV can be regarded as the difference between the total lateral acceleration to which the vehicle is subject and the centrifugal acceleration, i.e., it is related to a change of the sideslip angle, the angle between the longitudinal direction of the vehicle and the displacement direction of its centre of gravity.

The subtracting stage 12 forwards a yaw rate error YRE and lateral velocity derivative error LVE signals to a stability index calculating section 14. Calculating section 14 is connected to lookup tables 15, 16. Lookup table 15 stores a yaw rate dead band YRDB as a function of longitudinal velocity VX and steering wheel angle SWA, table 16 stores a lateral velocity derivative dead band LVDB as a function of VX and SWA. These dead bands represent a predetermined percentage of a yaw rate or a lateral velocity derivative above which, for a given vehicle speed and steering wheel angle, control over the vehicle is lost. If the apparatus of the invention is used in combination with an electronic stability control (ESC system), the ESC system may use associated dead bands of the yaw rate and the lateral velocity derivative for deciding whether to intervene or not, which are directly proportional to the dead bands of lookup tables 15, 16. If, for example, the dead bands of the ESC system are at 70% of a value at which control of the vehicle is lost for a given vehicle speed and steering wheel angle, the dead bands of tables 15, 16 may be at 50% of such a value, ensuring, as will become clearer in the following, that the apparatus of the invention will issue a warning signal prior to any intervention of the ESC.

From the dead bands YRDB, LVDB of tables 15, 16 and the error signals YRE, LVE from subtracting stage 12, stability index calculating section 14 derives yaw rate and lateral velocity derivative stability indices YRSI, LVSI as follows.

$$YRSI = |YRE|/YRDB \quad (2)$$

$$LVSI = |LVE|/LVDB.$$

Figure 2:
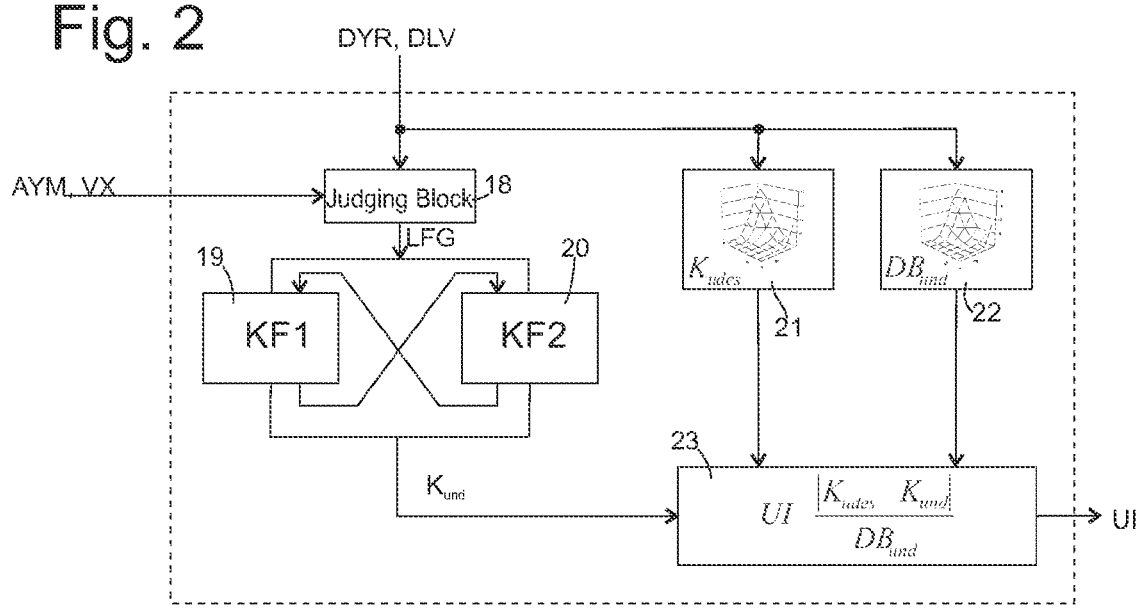
FIG. 2 is a block diagram of a detail of the apparatus of FIG. 1.

Structure and operation of an understeer index calculating section 17 are explained in detail referring to FIG. 2. For estimating the understeer of a vehicle, it is important to know whether the vehicle is moving in a linear regime, in which the sideslip angle of the vehicle is approximately directly proportional to the lateral forces to which it is subject, or in a nonlinear regime, in which the sideslip angle increases much more strongly with the lateral forces than in the linear case. In order to judge the regime of the vehicle, a judging block 18 is provided. The judging block 18 receives the desired yaw rate DYR and the desired lateral velocity derivative DLV from DCI 11. From bus 10 it receives lateral acceleration AYM and longitudinal velocity VX. Based on these quantities, the judging block 18 periodically verifies three conditions, namely:

$$|DYR*VX + DLV| - |AYM| < AY\_THR1 \quad (3)$$

$$(DYR*VX + DLV)*AYM > -ASQ\_THR2 \quad (4)$$

$$|DYR - EYR| \leq YR\_Max. \quad (5)$$

The first condition, set forth in equation (3) is fulfilled whenever the measured lateral acceleration AYM is in close agreement with what would be expected based on the desired yaw rates DYR and lateral velocity derivatives DLV at the present vehicle speed VX. The condition is not necessarily fulfilled in the linear regime only, but if it is fulfilled, the vehicle is likely to be in the linear regime.

From this first condition, set forth in equation (3), it is clear already that in the second condition, set forth in equation (4) the term in parentheses should be closely correlated to the lateral acceleration AYM. If the correlation was exact, the left hand side of the inequality would always be positive, and equation (4) would always be fulfilled. The correlation is not perfect in the nonlinear regime; here a phase lag may occur between AYM and the term in parentheses, so that the left hand side of the equality may become more negative than −ASQ_THR2 which is a tiny negative threshold.

According to the third condition, set forth in equation (5), the yaw rate error |DYR −EYR| must not exceed a predetermined threshold YR_max. If these three conditions have been fulfilled continuously during a predetermined time interval, or if they have been fulfilled continuously since the start of the vehicle, a linear flag LFG output by judging block 18 takes a value of 1; otherwise it is zero.

To the above three conditions eq. (3) to eq. (5), a fourth condition may be added:

$$YR\_Min < |DYR-EYR| \qquad (5)$$

Where YR_Min is a small positive figure. This condition prevents inappropriately frequent switching between LFG=0 and LFG=1, since if the vehicle is going straight, eq. (5') is not fulfilled and LFG cannot change from 0 to 1.

The linear flag LFG controls the operation of two Kalman filters 19, 20 for estimating understeer of the vehicle in linear and non-linear regimes, respectively.

In the linear regime, with linear flag LFG=1, a steady-state understeer can be calculated according to $$K_{und\_linear} = \frac{L}{VX^2}\left(\frac{\partial SWA}{\partial(L/R)} - 1\right) \qquad (6)$$

Where L denotes the wheel base and R the turning radius of the vehicle.

While linear flag LFG =1, Kalman filter 20 is inoperative, and equation (6) translates into the following equations for Kalman filter 19:

$$y(t) = \frac{SWA - L*AYM}{VX^2}, H(t) = AYM \qquad (7)$$

$$x(t+1) = x(t) + v(t)$$
$$y(t) = H(t)x(t) + e(t)$$

$$S(t) = P(t-1) + Q(t-1) \qquad (8)$$
$$K(t) = S(t)H^T(t)(H(t)S(t)H^T(t) + R(t))^{-1}$$
$$\hat{x}(t) = \hat{x}(t-1) + K(t)(y(t) - H(t)\hat{x}(t-1))$$
$$P(t) = S(t) - K(t)H(t)S(t)$$

In the nonlinear regime, the understeer can be calculated according to $$K_{und\_nl} = \frac{d(\alpha_f - \alpha_r)}{d(AYM)} \qquad (9)$$

Where $\alpha_f$, $\alpha_r$ are the front and rear tire slip angles. When the judging block 18 detects the vehicle to be in non-linear regime, the linear flag LFG becomes zero, whereupon filter 19 stops and filter 20 starts to operate, initialized with at least the most recent understeer value from filter 19 and, eventually, one or more of its covariance values. Filter 20 is similar to filter 19 except for the quantities used for y(t) and H(t) in equation (7):

$$y(t) = \frac{d(\alpha_f - \alpha_r)}{dt}, H(t) = \frac{dAYM}{dt} \qquad (10)$$

Similarly, when ERF changes back to 1, filter 19 becomes operative again and is initialized with a nominal understeer based on the front and rear lateral tire stiffness and the front and rear vehicle weight distribution and with initial covariance values.

In principle, the two filters 19, 20 might be regarded as a single Kalman filter which swaps y(t) and H(t) according to the value of LFG.

In analogy to what was described above for stability indices YRSI, LVSI, lookup tables 21, 22 are provided for values of a desired understeer $K_{udes}$ and a dead band of the understeer $DB_{und}$. As in case of the yaw rate and the lateral velocity derivative, desired understeer values can be predetermined empirically by measuring the understeer of a test vehicle at given speeds and steering wheel angles. Alternatively, they may be calculated in advance or in real time, e.g., using the following formula:

$$K_{udes} = \max\left(\frac{1}{V_x^2}\left(\frac{V_x\delta}{\dot{\psi}_{des}} - L\right), \frac{W_f}{C_f} - \frac{W_r}{C_r}\right) \qquad (11)$$

Where $C_f$, $C_r$ are the front and rear lateral tire stiffness, and $W_f$, $W_r$ is the part of the vehicle weight, which rests on the front and rear axle, respectively. Since $K_{udes}$ may take impractically high values according to equation (11) above at high speeds and steering wheel angles, it is preferred to define an upper limit of the desired understeer $K_{udes}$ as follows $$K_{udes} = \min\left(\max\left(\frac{1}{V_x^2}\left(\frac{V_x\delta}{\dot{\psi}_{des}} - L\right), \frac{W_f}{C_f} - \frac{W_r}{C_r}\right), K_{und\_max}\right) \qquad (12)$$

Where the upper limit $K_{und\_max}$ may be set to e.g. 10°/g or 5°/g, g denoting the gravity acceleration.

In analogy to YRDB, LVDB the understeer dead band UDB gives values of the understeer which can be regarded as safe for a given steering wheel angle SWA and vehicle speed VX. Arithmetic unit 23 calculates an understeer index UI based on the effective vehicle understeer $K_{und\_linear}$ or $K_{und\_nl}$ estimated by filter 19 or 20, the desired understeer $K_{udes}$ from table 21 and the understeer dead band $DB_{und}$ from table 22:

$$UI = \frac{|K_{udes} - K_{und}|}{DB_{und}} \qquad (13)$$

Referring again to FIG. 1, three indices URSI, LVSI and UI are supplied to arbitrator unit 24. Albeit of different origin, the three indices are comparable in that they are dimensionless figures and that a value above 1 is indicative of a critical driving situation.

The operation of the arbitrator unit 24 is explained referring to the flowchart of FIG. 3. The method of this flowchart is iterated regularly in arbitrator unit 24. The first step S1 of the method is the determination of a driving mode of the vehicle. Methods for judging a driving mode of a vehicle, such as straight line driving, cornering, braking, accelerating etc., are known to the skilled person from various previous applications of the same applicant, so that only a brief outline is given here. For the purposes of the present invention, it is sufficient to distinguish between a transient mode, i.e., a mode in which the steering wheel angle SWA changes sign frequently or in which its time derivative exceeds a predetermined threshold, a straight line driving mode, where both the steering wheel angle SWA and its time derivative are close to zero for a predetermined time, and any other driving mode.

In the transient mode the direction of the vehicle is changing so rapidly that the understeer calculated by arithmetic unit 23 cannot be relied upon. Therefore, if the driving mode is found to be the transient mode in S2, the decision whether the vehicle is in a critical situation or not can only be based on the yaw rate and lateral velocity derivative indices YRSI, LVSI, and a general stability index is set equal to the higher one of YRSI and LVSI in step S3.

If the vehicle is not in the transient mode, step S4 compares the detected steering wheel angle SWA to a predetermined upper threshold SWA_Hi. If this threshold is exceeded, there is a considerable risk of the vehicle being unstable, and the system should be rather liberal in issuing a warning. In that case, the general stability index is set equal to the higher one of YRSI and UI in step S5.

Otherwise, a weighted sum k*YRSI+(k−1)UI of the yaw rate stability index YRSI and understeer index UI is calculated in step S6. The weighting factor k is tuned to a value between 0 and 1 and by the designer of the vehicle. The weighting factor k may be set dependent on the vehicle speed VX and preferably decreases with the vehicle speed, giving increasing importance to the understeer at high speeds.

From any of steps S3, S5, S6, the method proceeds to step S7, in which it is decided whether the vehicle is in a straight line driving mode. If so, step S8 multiplies the general stability index determined in any of steps S3, S5, S6 by a positive factor SL, which is smaller than 1, reflecting the fact that the vehicle is least susceptible to a loss of control if it is driving a longer straight line. For example, SL can be 0.1. Otherwise, the method proceeds directly from step S7 to step S9.

In step S9, the general stability index is compared to an upper threshold, e.g., 0.8. If it exceeds this upper threshold, a warning flag is set to TRUE in step S10. Since the dead bands for lateral velocity derivative and yaw rate in tables 15, 16 are set lower than those of an ESC system, the warning flag will become TRUE prior to any intervention of the ESC system.

The warning flag can be used in different ways. According to a first embodiment, a head up display 25 can be provided in the vehicle, which is activated by the warning flag becoming TRUE, and which displays to the driver an invitation to reduce speed. According to another embodiment, a vibrator 26 is activated, driving a vibration of a control pedal of the vehicle or of its steering wheel.

In case of the accelerator pedal, the warning flag may also be used to trigger a vibrator 27 which pushes the accelerator pedal towards its rest position against the pressure exercised by the driver's foot. In this way, the driver can be caused to reduce speed very effectively without directly superseding his commands. If he is getting too fast due to lack of attention, it is likely that the actuator will press his foot back and reduce the thrust of the engine, whereas in an emergency situation, where the driver has pressed the accelerator pedal to the bottom in order to escape from a danger, the actuator is unlikely to overcome the pressure of the driver's foot, and the vehicle follows the driver's instructions faithfully up to the point where an intervention by the ESC becomes necessary.

If the stability index was found not to exceed the upper threshold in step S9, the index is compared to a lower threshold in step S11. This lower threshold may equal, e.g., 0.2. If it is below this lower threshold, the warning flag is set to FALSE in step S12; if not, the warning flag is left as it is until the procedure is repeated.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for assisting a driver of a motor vehicle comprising the steps of:
monitoring a first quantity selected among at least one of vehicle sideslip, yaw rate error, or an understeer and a second quantity correlated to vehicle sideslip, yaw rate error or the understeer;
deciding that there is a risk of the vehicle becoming unstable if the first quantity or the second quantity or a third quantity derived from at least one of the first quantity or the second quantity exceeds a first threshold; and
issuing a warning signal if it is decided that there is the risk;
wherein the step of deciding comprises normalizing the first quantity, the second quantity, or the third quantity in relation to a reference value and deriving a fourth quantity for comparison to said first threshold from at least two of a normalized first quantity, second quantity or third quantity.

2. The method of claim 1, wherein the first threshold is a function of a vehicle speed and a steering wheel angle.

3. The method of claim 1, wherein the warning signal is issued as an audible signal.

4. The method of claim 1, wherein the warning signal is outputted as a braking control signal to a brake.

5. The method of claim 1, further comprising the step of selectively braking a wheel in case of any of the first quantity, the second quantity or the third quantity exceeding a second threshold; the second threshold determined so as to be exceeded substantially if the first threshold is also exceeded.

6. The method of claim 5, wherein the first threshold and the second threshold are defined for a same quantity.

7. The method of claim 1, further comprising a step of cancelling the warning signal if a quantity which exceeded the first threshold drops below a third threshold which is lower than the first threshold.

8. The method of claim 1, wherein the fourth quantity is a sum of the normalized first quantity, the second quantity, or the third quantity.

9. The method of claim 1, wherein the fourth quantity is a sum of the normalized first quantity, second quantity, or third quantity, and a maximum is selected as a fifth quantity for comparison if a steering wheel angle is above a predetermined threshold, and a weighted sum is selected if the steering wheel angle is below the predetermined threshold.

10. The method of claim 1, wherein the warning signal is issued as a visible signal.

11. The method of claim 10, wherein the visible signal is displayed in a head-up display.

12. The method of claim 1, wherein the warning signal is issued as a haptic signal.

13. The method of claim 12, wherein the haptic signal drives an actor associated with a control pedal.

14. A method for assisting a driver of a motor vehicle comprising the steps of:
- monitoring a first quantity selected among at least one of vehicle sideslip, yaw rate error, or an understeer and a second quantity correlated to vehicle sideslip, yaw rate error or the understeer;
- deciding that there is a risk of the vehicle becoming unstable if the first quantity or the second quantity or a third quantity derived from at least one of the first quantity or the second quantity exceeds a first threshold;
- issuing a warning signal if it is decided that there is the risk;
- judging whether the vehicle is moving in a substantially straight line; and
- setting at least the first threshold higher than if the vehicle is not judged to be driving in the substantially straight line.

15. A method for assisting a driver of a motor vehicle comprising the steps of:
- monitoring a first quantity selected among at least one of vehicle sideslip, yaw rate error, or an understeer and a second quantity correlated to vehicle sideslip, yaw rate error or the understeer;
- deciding that there is a risk of the vehicle becoming unstable if the first quantity or the second quantity or a third quantity derived from at least one of the first quantity or the second quantity exceeds a first threshold;
- issuing a warning signal if it is decided that there is the risk;
- monitoring a time derivative of a steering wheel angle of the vehicle, and
- based on the step of deciding, understeering only if an amount or a frequency of change of a sign of the time derivative is below a predetermined threshold.

* * * * *